(12) United States Patent
Sung

(10) Patent No.: US 8,485,568 B2
(45) Date of Patent: Jul. 16, 2013

(54) LOCKING DEVICE HAVING POSITIONING AND FLOATING ADJUSTABLE CAPABILITY

(75) Inventor: Tzu-Wen Sung, Taipei (TW)

(73) Assignee: Inventec Corporation, Taipei (TW)

( * ) Notice: Subject to any disclaimer, the term of this patent is extended or adjusted under 35 U.S.C. 154(b) by 505 days.

(21) Appl. No.: 12/727,821

(22) Filed: Mar. 19, 2010

(65) Prior Publication Data

US 2011/0101705 A1 May 5, 2011

(30) Foreign Application Priority Data

Nov. 3, 2009 (TW) .............................. 98137267 A

(51) Int. Cl.
*E05C 1/06* (2006.01)
(52) U.S. Cl.
USPC ......................................... 292/155; 292/138
(58) Field of Classification Search
USPC ....................... 292/155, 138, 137, 1, DIG. 61
See application file for complete search history.

(56) References Cited

U.S. PATENT DOCUMENTS

| 4,609,233 A * | 9/1986 | Walla ............................. 312/219 |
| 4,838,624 A * | 6/1989 | Walla ............................. 312/221 |
| 7,798,583 B2 * | 9/2010 | Yang et al. ............... 312/334.46 |

FOREIGN PATENT DOCUMENTS

| TW | 213264 | 9/1993 |
| TW | I234050 | 6/2005 |

* cited by examiner

*Primary Examiner* — Carlos Lugo
*Assistant Examiner* — Mark Williams
(74) *Attorney, Agent, or Firm* — WPAT, PC; Justin King

(57) ABSTRACT

A locking device having positioning and floating adjustable capability is provided, which includes a positioning part, disposed on a lateral side of an apparatus, the lateral side has at least one fixing opening, having a positioning opening at a periphery of the at least one fixing opening, and at least one side of the positioning opening has a necking channel; a bracket, having a sliding slot while being disposed on a frame; and a locking element, slidably coupled to the sliding slot, and enters the positioning opening under the guide of the necking channel while sliding in the sliding slot, so as to be aligned with the fixing opening. Moreover, the locking device is applicable to an apparatus having different fixing opening locations, so that the locking element can be aligned with the fixing opening easily and conveniently, thereby locking the apparatus to the bracket.

8 Claims, 7 Drawing Sheets

LOCKING DEVICE HAVING POSITIONING AND FLOATING ADJUSTABLE CAPABILITY

BACKGROUND OF THE INVENTION

1. Field of Invention

The present invention relates to a locking technology, and more particularly to a locking device having positioning and floating adjustable capability, which has a floating adjustable position for a locking element and is capable of aligning the locking element to a locking position.

2. Related Art

Along with the progress of the information technology, the modern society is in an era with booming development of the information technology. Therefore, the application performance of conventional personal computers can no longer satisfy the high-speed and mass data processing requirements of the enterprises. In order to cater to the demands on high-speed and mass data storage and processing, persons skilled in the field of computer information have developed various servers having dedicated functions, which are provided to the enterprises to meet different using requirements.

Common servers are placed in one cabinet concentratedly. Referring to FIG. 1, it is a schematic view of a conventional cabinet. Generally speaking, a cabinet 1 has a door blade 10, and after the door blade is opened, an accommodation space 11 appears. Frames 12 are disposed at two sides of the accommodation space 11, and each of the frames 12 has a plurality of openings 13, such that locking elements 14 pass through the openings 13 to lock a server 15 to the frames 12. In addition to the locking effect on the front surface, a bracket 16 is further disposed between the lateral side of the server 15 and the cabinet 1 to further enhance the locking effect, and one end of the bracket 16 is locked on the frame. The lateral side of the server 15 is then locked with the bracket 16 through a locking element 17.

However, various types of servers are available, and the servers are designed with different sizes and dimensions according to their different functions. Therefore, to cater to the servers with different dimensions, the dimensions and sizes of the cabinets vary accordingly (for example, the extended dashed lines in FIG. 1 represent a different dimension of the cabinet). Along with the dimension change of a server, by taking a depth D as an example, positions of locking holes 150 at the lateral side of the server are also changed. Therefore, when locking the server at the lateral side, a bracket 16 having a proper dimension and capable of being aligned with the opening positions of the locking holes 150 at the lateral side of the server 15 should be selected, so as to lock the server 15 to the bracket 16. However, due to the error of the drilling process, the locking holes 150 on the server 15 are often inconsistent with through holes 18 on the bracket 16 and cause difficulties and troubles in locking.

In order to overcome the inconvenience in locking caused by the servers with different dimensions, in the prior art, for example, ROC Patent Publication No. 1234050, a bracket is disclosed, which has an elongated sliding slot for a locking element to pass through and slide therein. The locking element can slide in the sliding slot, so that the locking element may be easily adjusted in position, so as to be aligned with a fixing opening on an apparatus, thereby achieving the locking effect. For another example, in ROC Patent Publication No. 213264, an aluminum-extrusion cabinet frame is disclosed. The frame is provided with a groove, and floating screw bases are disposed therein, such that a user may adjust the locking position by moving the screw bases.

The prior art can solve the problem about adjusting the position of the locking element, but the user is still required to move the locking element to be aligned with the fixing opening through observing with eyes, so as to achieve the locking function. However, in practical use, a great number of cabinets are arranged and the space is rather limited, so that it is difficult for the user to align the locking element with the fixing opening of the server through observing with eyes. Therefore, the user may align the locking element with the fixing opening of the server merely through perception, which, however, causes great trouble and inconvenience in use.

In view of the above, a locking device having positioning and floating adjustable capability is in urgent need, so as to solve the problems in the prior art.

SUMMARY OF THE INVENTION

The present invention is directed to a locking device having positioning and floating adjustable capability, which includes a locking element having an adjustable locking position, and is capable of enabling the locking element to be rapidly aligned with and positioned to a fixing opening on an apparatus to be locked while the locking element is moving, such that the locking device is applicable to various frames having different depths and sizes (for example, frames used by servers), and the user is enabled to easily align the locking element with the fixing opening without the assistance of the visual observation and lock the apparatus easily.

In an embodiment, the present invention provides a locking device having positioning and floating adjustable capability, which includes a positioning part, a bracket, and a locking element. The positioning part is disposed on a lateral side of an apparatus, the lateral side has at least one fixing opening, the positioning part has a positioning opening at a periphery of each fixing opening, and at least one side of the positioning opening has a necking channel respectively. The bracket having a sliding slot is disposed on a frame. The locking element is slidably coupled to the sliding slot, and has a locking part. When the locking element slides in the sliding slot, the locking part enters the positioning opening by passing through the necking channel, such that the locking part is aligned with the fixing opening.

DETAILED DESCRIPTION OF THE INVENTION

In order to make the features, objectives, and functions of the present invention more comprehensible, the related detailed structures and design ideas and reasons of the device of the present invention are illustrated below, so that the Examiner can understand the characteristics of the present invention. The detailed illustration is as follows.

Figure 1:
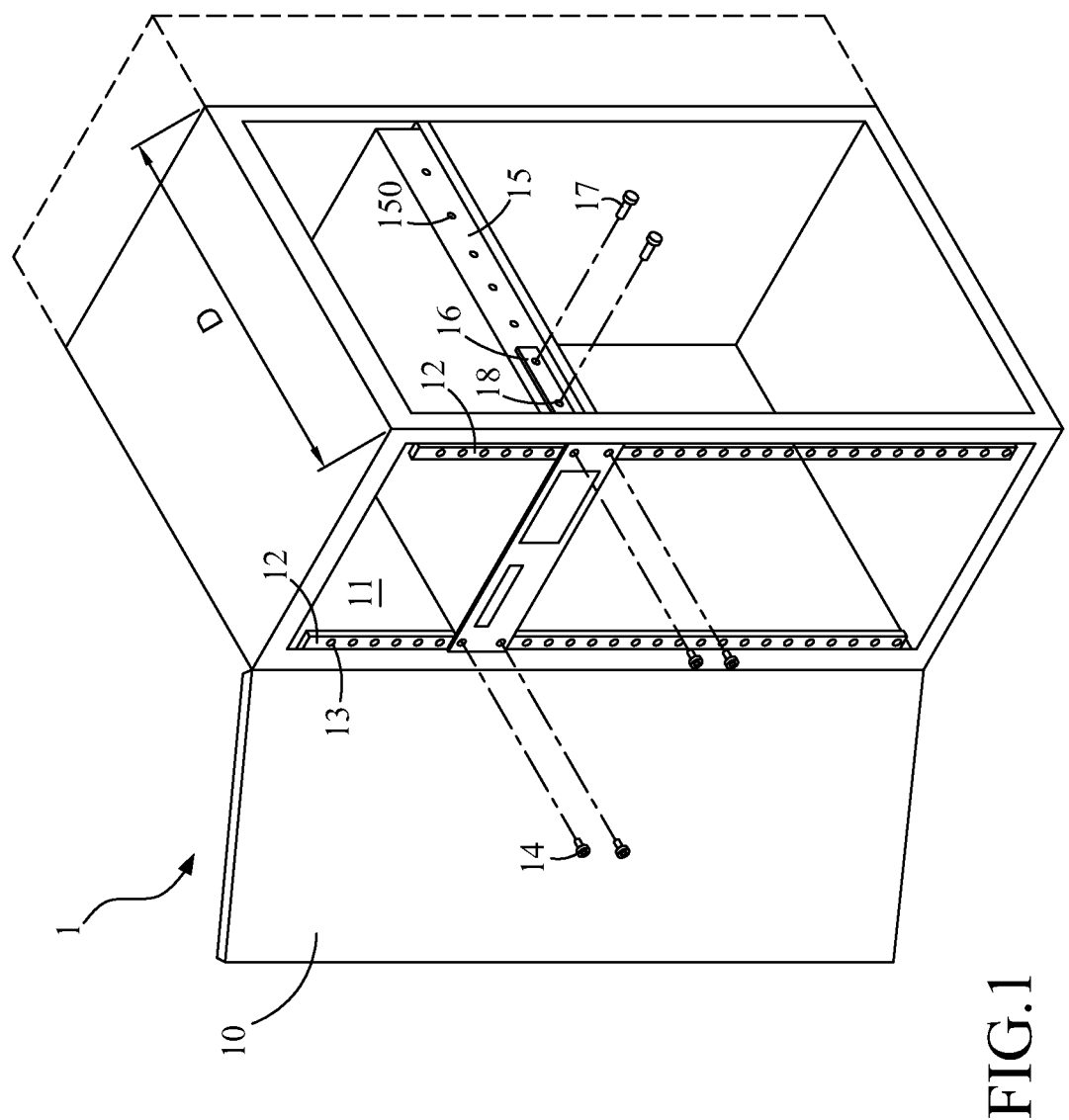
FIG. 1 is a schematic view of a conventional cabinet.
Figure 2:
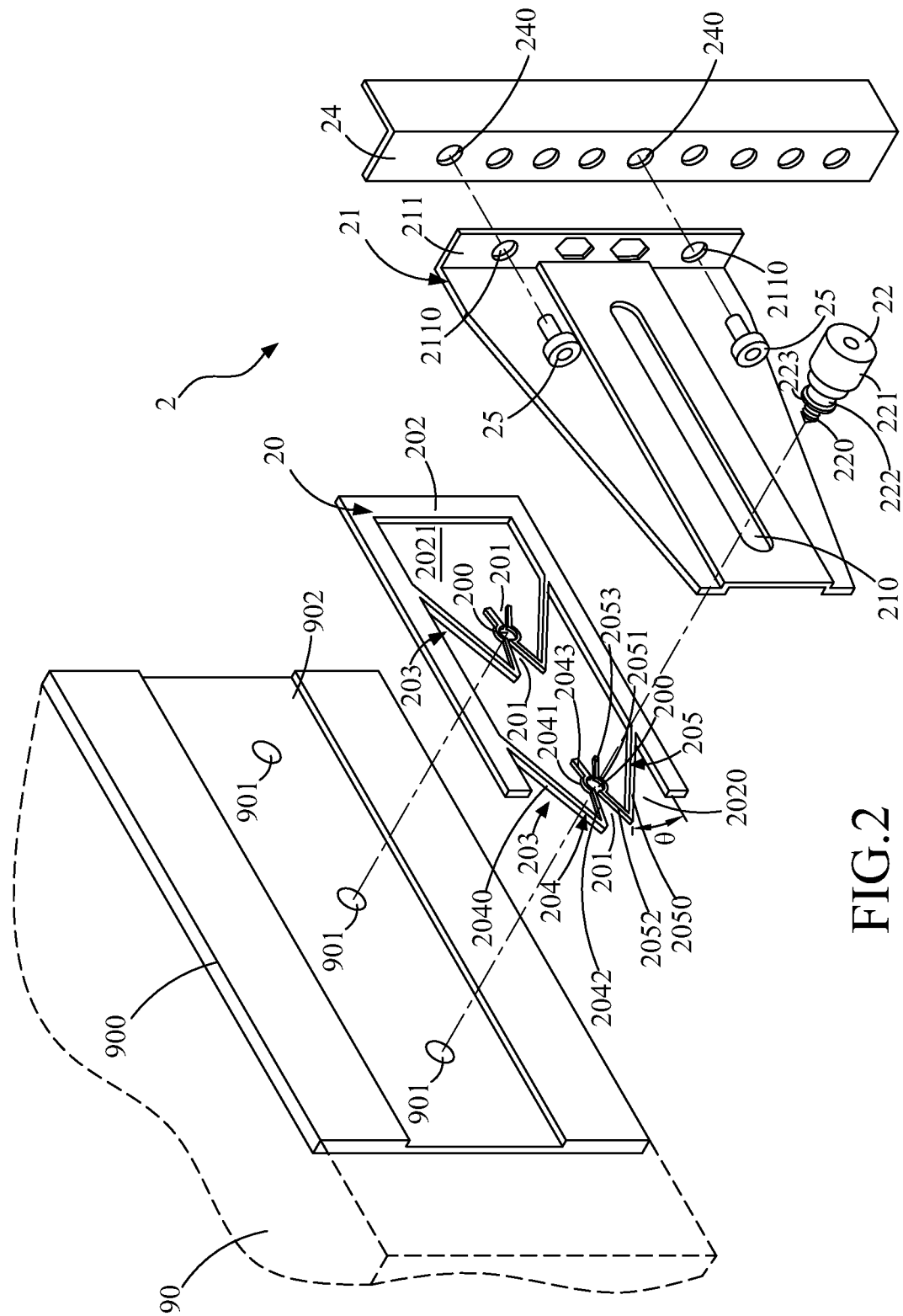
FIG. 2 is a schematic three-dimensional exploded view of a locking device having positioning and floating adjustable capability according to the present invention.

FIG. 2 is a schematic three-dimensional exploded view of a locking device having positioning and floating adjustable capability according to the present invention. Referring to FIG. 2, a locking device 2 includes a positioning part 20, a bracket 21, and a locking element 22. The positioning part 20 is disposed on a lateral side 900 of an apparatus 90. The lateral side 900 has at least one fixing opening 901. The positioning part 20 has a positioning opening 200 at a periphery of each fixing opening 901. A necking channel 201 is provided respectively at two sides of the positioning opening 200. The type of the apparatus 90 is not limited here, which may be any apparatus required to be fixed. In this embodiment, the apparatus 90 is an electronic apparatus, such as a server, a router, a network switch, a storage media (for example, a hard disk), or a reading apparatus (for example, an optical disk drive) that needs to be fixed in an accommodation space within a cabinet through being locked at the lateral side. Moreover, the present invention also can be applied when the apparatus is hung or fixed on a wall, for example, when a display is hung on a frame fixed on the wall.

In this embodiment, the positioning part 20 further includes a concave base 202 and two pairs of elastic alignment parts 203. The concave base 202 has an opening side 2020 and has an accommodation space 2021 therein. The two pairs of elastic alignment parts 203 are respectively disposed in the accommodation space 2021, and each pair of elastic alignment parts 203 is corresponding to a fixing opening 901 on the lateral side 900. Each elastic alignment part 203 further has a pair of support arms 204 and 205 disposed symmetrically. Each of the support arms 204 and 205 further includes: a first rod 2040, 2050, a curved rod 2041, 2051, and a pair of second rods 2042, 2043 and 2052, 2053. The first rod 2040, 2050 is connected to an inner wall of the concave base 202, and forms an included angle θ with the inner wall of the concave base 202. The curved rod 2041, 2051 is disposed at one side of the fixing opening 901. In this embodiment, each curved rod 2041 and 2051 has a curvature, so that the curved rod 2041 is corresponding to the other adjacent curved rod 2051, such that the two curved rods 2041 and 2051 form the positioning opening 200. In the pair of second rods 2042, 2043 and 2052, 2053, one second rod 2042, 2052 has one end connected to one end of the curved rod 2041, 2051 and the other end connected to the first rod 2040, 2050, and the other second rod 2043, 2053 is connected to the other end of the curved rod 2041, 2051. Thus, the second rods 2042, 2043 and 2052, 2053 of the pair of support arms 204 and 205 form the necking channels 201 at two sides of the positioning opening 200. That is, the opening corresponding to external ends of the second rods 2042, 2043 and 2052, 2053 is larger than the opening connected to the ends of the curved rods 2041 and 2051. Moreover, in order to conveniently set and adjust the position of the positioning part 20, a groove 902 is further provided on the lateral side 900 of the apparatus 90, such that an outer wall of the concave base 202 of the positioning part 20 bears against an inner wall of the groove 902. It should be noted that, in this embodiment, the positioning part 20 has two pairs of elastic alignment parts 203 therein, but the number is actually not limited here, and one pair or more than three pairs may also be disposed, which is determined depending upon the using requirements.

Figure 3A:
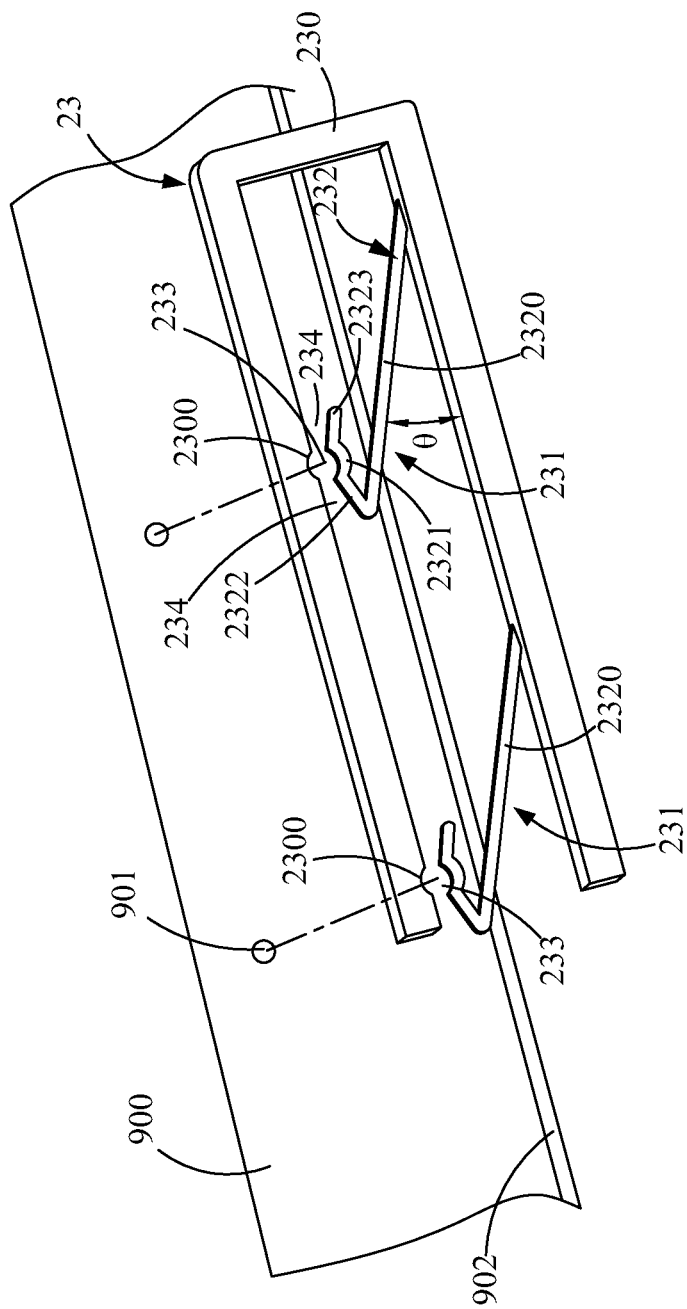
FIG. 3A is a schematic view of a positioning part according to another embodiment of the present invention.
Figure 3B:
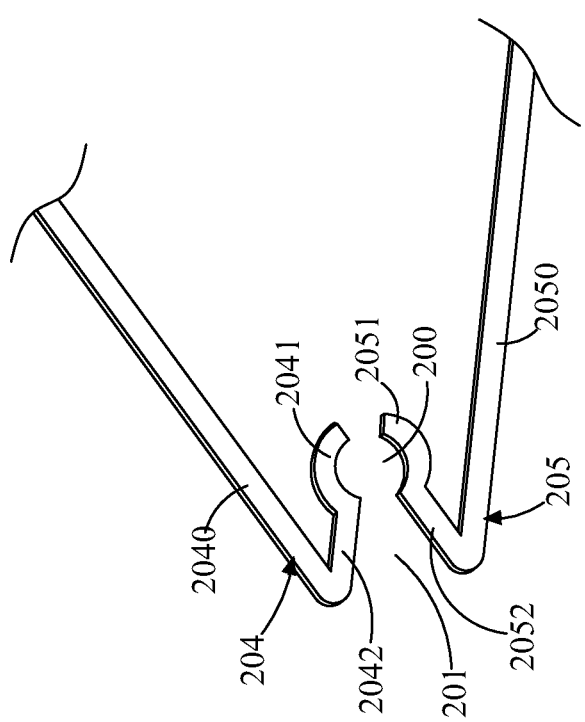
FIG. 3B is a schematic view of a position part according to still another embodiment of the present invention.

FIG. 3A is a schematic view of a positioning part according to another embodiment of the present invention. Referring to FIG. 3A, in this embodiment, a positioning part 23 includes a concave base 230 and at least one elastic alignment part 231. An inner lateral side of the concave base 230 has a groove 2300 at a position corresponding to the at least one fixing opening 901. Each elastic alignment part 231 is respectively corresponding to the at least one fixing opening 901, and each elastic alignment part 231 further has a support arm 232. The support arm 232 includes a first rod 2320, a curved rod 2321, and a pair of second rods 2322 and 2323. The first rod 2320 is connected to an inner wall of the concave base 230 and forms an included angle θ with the inner wall of the concave base 230. The curved rod 2321 is disposed at one side of the fixing opening 901, and the curved rod 2321 and the groove 2300 together form a positioning opening 233. In the pair of second rods 2322 and 2323, one second rod 2322 has one end connected to one end of the curved rod 2321 and the other end connected to the first rod 2320, and the other second rod 2323 is connected to the other end of the curved rod 2321. Thus, the second rods 2322 and 2323 of the support arm 232 and the inner wall of the concave base 230 together form necking channels 234 at two sides of the positioning opening 233. It should be noted that, in this embodiment, the positioning part 23 has two elastic alignment parts 231 therein, but the number is actually not limited here, and one or more than three elastic alignment parts may also be disposed, which is determined depending upon the using requirements. Moreover, as shown in FIG. 3B, in this embodiment, the necking channels 201 are not necessarily provided at both sides of the positioning opening 200 simultaneously, and the necking channel 201 on at least one side thereof can achieve the positioning effect as well.

Referring back to FIG. 2, the bracket 21 has a sliding slot 210, and the other end of the bracket 21 has a folded plate 211. The folded plate 211 has a plurality of fixing openings 2110 opened therein. The bracket 21 may be disposed on a frame 24, and the fixing openings 2110 on the bracket 21 are corresponding to positioning holes 240 on the frame 24, such that locking elements 25 are enabled to lock the bracket 21 to the frame 24. The locking element 22 is slidably coupled to the sliding slot 210, and the locking element 22 includes a cap 221, a sliding body 222, and a stopper 223. The sliding body 222 is connected to the cap 221, and is slidably coupled to the sliding slot 210. The stopper 223 is disposed at the other end of the sliding body 222, so as to prevent the locking element 22 from leaving the sliding slot 210. One side of the stopper 223 is further connected to the locking part 220, and is formed with a screw thread. When the locking element 22 slides in the sliding slot 210, a center of the locking part 220 of the locking element 22 is aligned with a central line of the positioning opening 200 of the two pairs of elastic alignment parts 203. Therefore, when the locking element 22 slides in the sliding slot 210, the locking element 22 enters the positioning opening 200 by passing through the necking channel 201, such that the locking part 220 is aligned with the fixing opening 901. In an embodiment, a minimum opening aperture of the necking channel 201 is smaller than a diameter of the locking part 220 of the locking element 22, such that when the locking part enters the positioning opening via the minimum opening of the necking channel, a positioning effect is achieved by the elastic resilience produced by the pair of support arms 204 and 205.

Figure 4A:
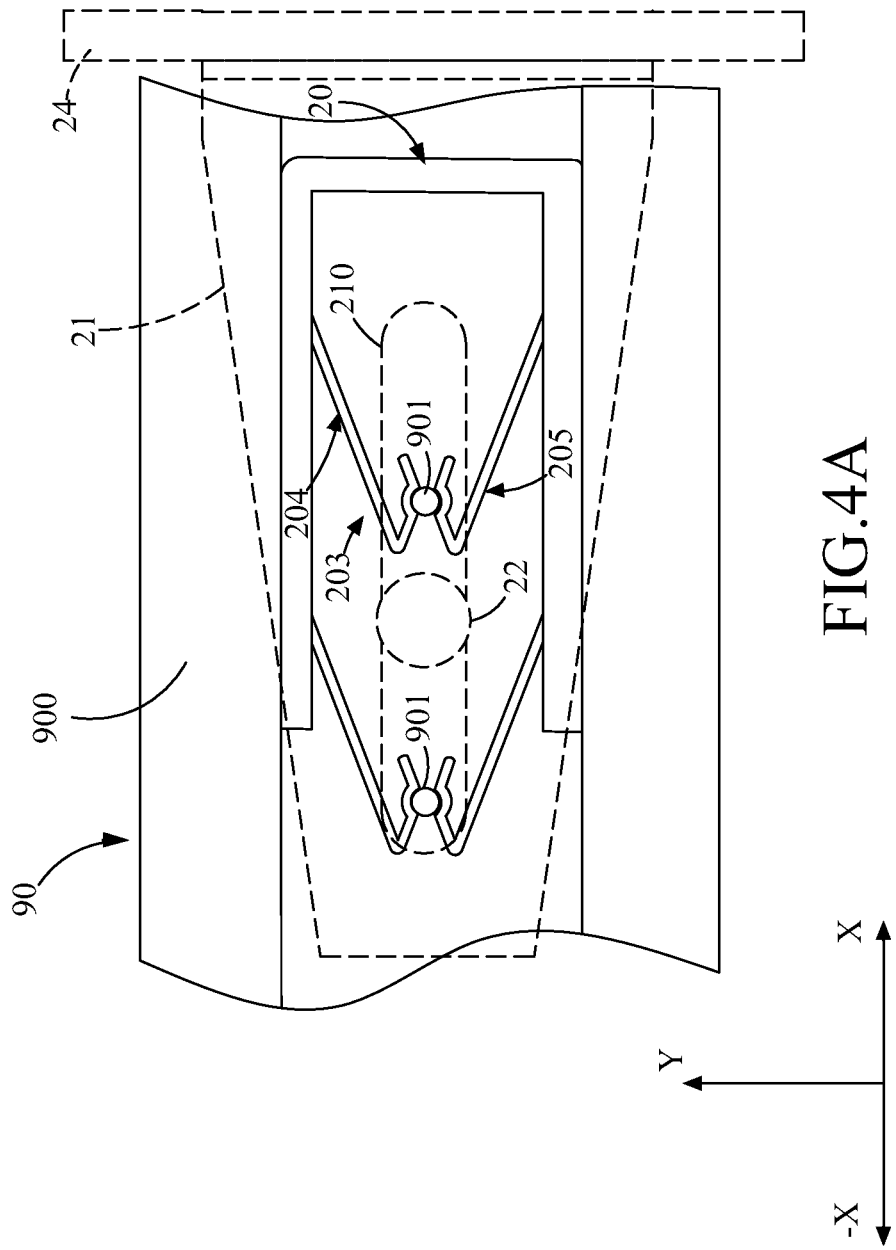
FIGS. 4A-4C are schematic views illustrating operations of the locking device according to the present invention.
Figure 4B:
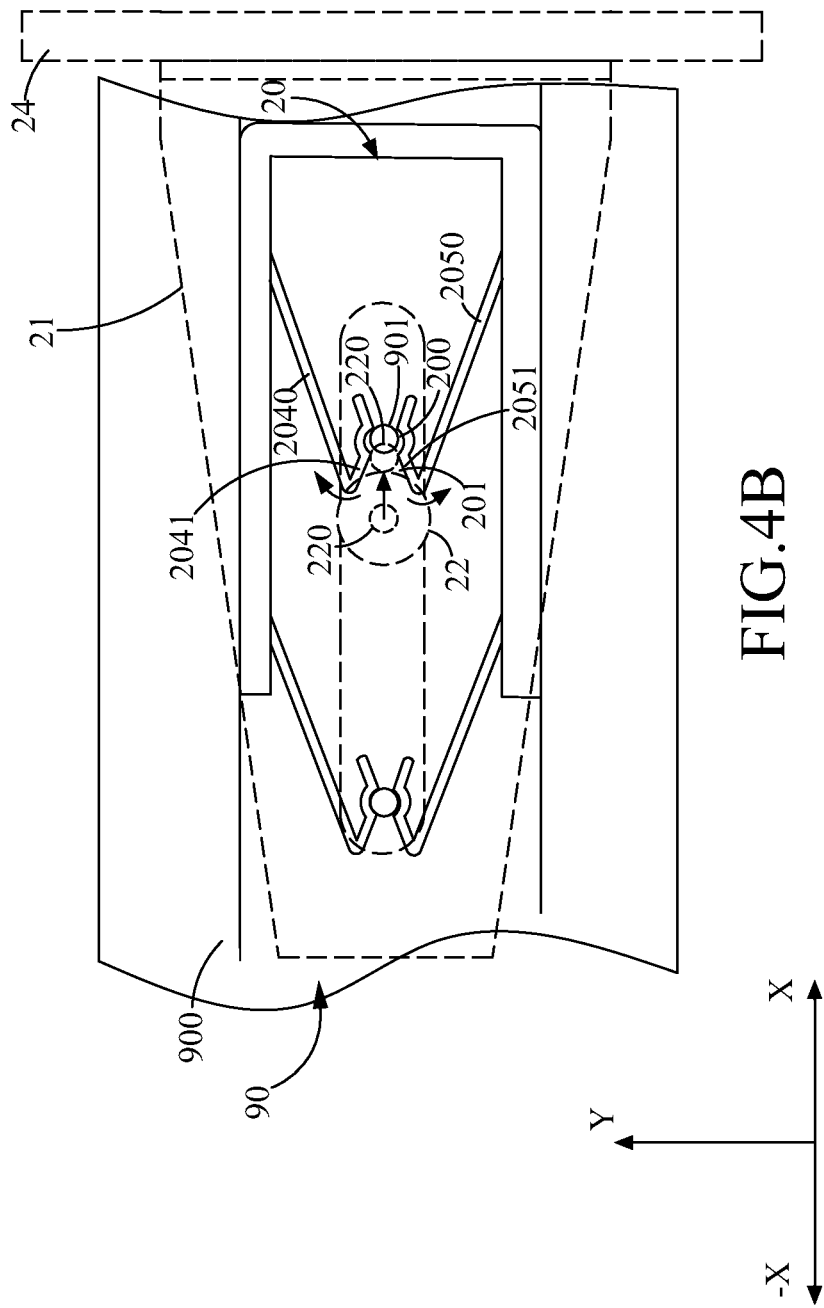
Figure 4C:
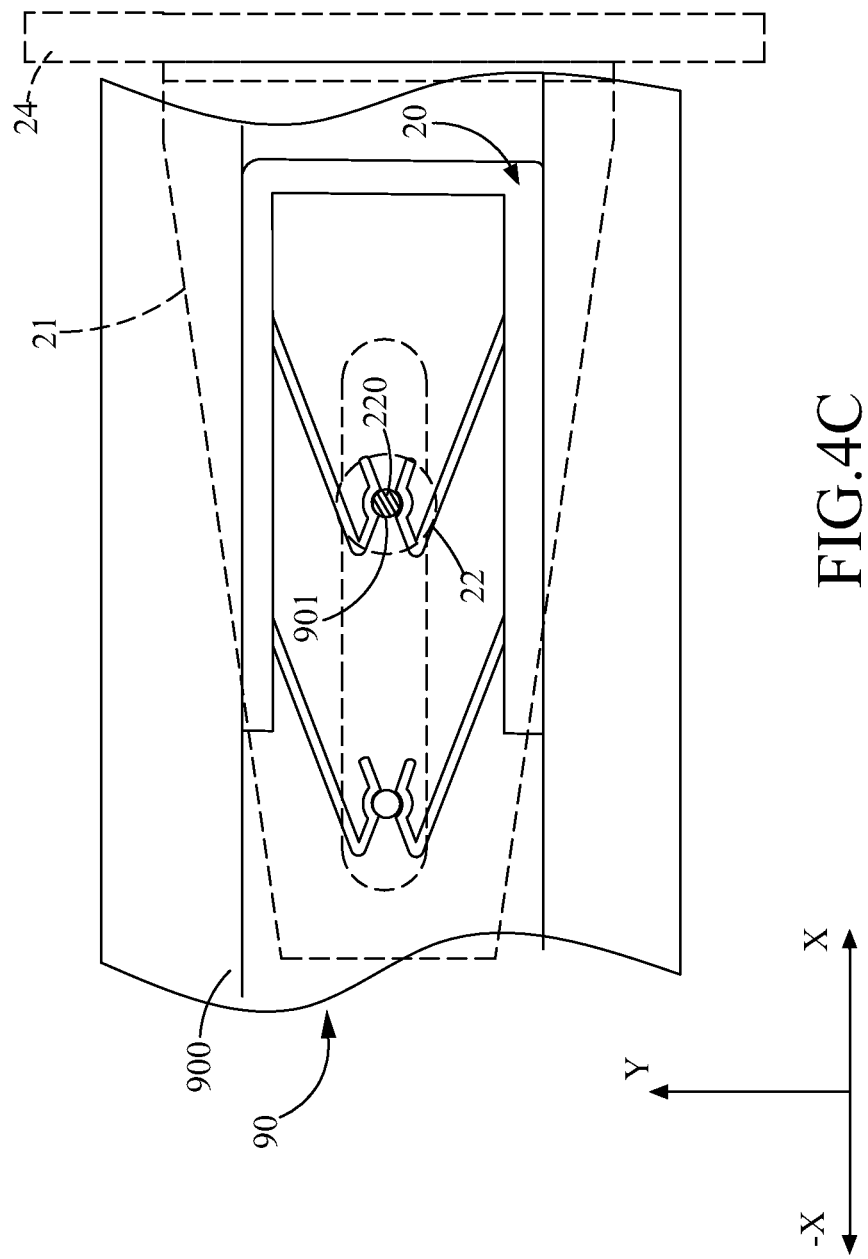

The locking manner of the present invention is illustrated herein below. FIGS. 4A-4C are schematic views illustrating operations of the locking device according to the present invention. Referring to FIGS. 4A-4C, in this embodiment, the apparatus 90 is a server. After the server is accommodated in the cabinet, the locking element 22 at the lateral side needs to be adjusted to lock the apparatus 90 to the bracket 21. The positions of the fixing openings 901 on the lateral side of the apparatus 90 may vary according to different sizes or specifications of different apparatuses, so that the user has to move the locking element 22 on the bracket 21 to be aligned with the fixing openings 901 on the lateral side 900. Referring to FIG. 4B, when the locking element 22 moves along an X direction, the locking part 220 of the locking element 22 enters the necking channel 201 from a maximum opening of the necking channel 201, and then enters the positioning opening 200 via a minimum opening of the necking channel 201 under the guide of the necking channel 201. The aperture of the minimum opening of the necking channel 201 is smaller than the width of the locking part 220. When the locking part 220 reaches a position of the necking channel 201 where the aperture is smaller than the diameter of the locking part 220, the second rods 2042 and 2052 are compressed, such that the first rods 2040 and 2050 move towards two sides to force the necking channel 201 to become much wider. The first rods 2040 and 2050 are elongated rod structures, so that they may be considered as cantilever structures. Therefore, when moving towards two sides (in a Y direction), the first rods 2040 and 2050 accumulate the elastic resilience. When the locking part 220 further moves forwards continuously to enter the positioning opening 200 to be aligned with the fixing opening 901, the locking part 220 no longer bears against the second rods 2042 and 2052, so that the first rods 2040 and 2050 are restored to the original positions due to the elastic resilience, and accordingly, the second rods 2042 and 2052 are restored to the original positions to generate a clamping effect to the locking part 220. In this way, the locking part 220 rests in the positioning opening 200 to form the state as shown in FIG. 4C. In the state of FIG. 4C, the locking part 220 may enter the corresponding fixing opening in a rotating manner, so as to lock the apparatus 90 to the bracket 21. On the contrary, if it intends to take out the apparatus 90, the user only needs to loosen the locking part 220, so as to remove the apparatus. As shown in FIGS. 4A to 4C, the moving direction of the locking element 22 is the X direction. However, if moving in −X direction, the locking element 22 enters the positioning opening 200 via the necking channel 201 at the right side of the positioning opening 200, which has the same principle and is not repeated here.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting device having positioning adjustability for mounting an apparatus in a cabinet with a frame, wherein the apparatus has a fixing opening and a groove, the locking device comprising:
    a positioning part, comprising:
        a concave base, wherein the concave base is fitted into the groove of the apparatus;
        at least one elastic support arm, respectively corresponding to the fixing opening of the apparatus, comprising
            a first rod, connected to an inner wall of the concave base;
            a curved rod, disposed at one side of the fixing opening, wherein the curved rod forms a positioning opening at a periphery of the fixing opening of the apparatus; and
            a pair of second rods, wherein one of the second rods has one end connected to one end of the curved rod and another end connected to the first rod, and another one of the second rods is connected to an other end of the curved rod, such that the second rods of the support arm and the inner wall of the concave base together form necking channels at two sides of a positioning opening;
    a bracket, having a sliding slot, and disposed on the frame and positioned adjacent to the positioning part; and
    a securing element, having a securing part;
    wherein the securing element passes through the sliding slot to reach the positioning part, the securing element slides along in the sliding slot to position the securing part into the necking channel, such that the pair of second rods are compressed and the elastic support arm provides a elastic resilience until the securing part enters the positioning opening and is aligned with the fixing opening for connecting with the fixing opening.

2. A mounting device having positioning adjustability for mounting an apparatus in a cabinet with a frame, wherein the apparatus has a fixing opening and a groove, comprising:
    a positioning part, comprising:
        a concave base;
        at least one pair of elastic support arms, respectively corresponding to the at least one fixing opening, and symmetrically disposed in the concave base, wherein each of the support arms further comprises:
            a first rod, connected to an inner wall of the concave base;
            a curved rod, disposed at one side of the fixing opening, such that curved rods of the pair of support arms form the positioning opening at a periphery of the fixing opening of the apparatus; and
            a pair of second rods, wherein one of the second rods has one end connected to one end of the curved rod and another end connected to the first rod, and another one of the second rods is connected to an other end of the curved rod, such that the second rods of the pair of support arms form the necking channels at two sides of a positioning opening;
    a bracket, having a sliding slot, and disposed on the frame and positioned adjacent to the positioning part; and
    a securing element, having a securing part;
    wherein the securing element passes through the sliding slot to reach the positioning part, the securing element slides along in the sliding slot to position the securing part into the necking channel, such that the pair of second rods are compressed and the elastic support arm provides a elastic resilience until the securing part enters the positioning opening and is aligned with the fixing opening for connecting with the fixing opening.

3. The mounting device having positioning adjustability for mounting the apparatus in the cabinet according to claim 1, wherein the groove is further provided at the lateral side of the apparatus, for accommodating the positioning part.

4. The mounting device having positioning adjustability for mounting the apparatus in the cabinet according to claim 1, wherein the frame has a plurality of first through holes, and the bracket has a plurality of second through holes corresponding to the plurality of first through holes.

5. The mounting device having positioning adjustability for mounting the apparatus in the cabinet according to claim 1, wherein the apparatus is an electronic apparatus.

6. The mounting device having positioning adjustability for mounting the apparatus in the cabinet according to claim 1, wherein the securing element further comprises:
    a cap;
    a sliding body, connected to the cap, and slidably coupled to the sliding slot; and
    a stopper, disposed at another end of the sliding body, for preventing the securing element from leaving the sliding slot, wherein one side of the stopper is connected to the securing part.

7. The mounting device having positioning adjustability for mounting the apparatus in the cabinet according to claim 1, wherein the securing part is formed with a screw thread.

8. The mounting device having positioning adjustability for mounting the apparatus in the cabinet according to claim 1, wherein the frame is used by a server.

* * * * *